(12) United States Patent
Omura

(10) Patent No.: US 9,177,584 B2
(45) Date of Patent: Nov. 3, 2015

(54) VINYL POLYMER AND USAGE THEREOF

(75) Inventor: Kazufumi Omura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 533 days.

(21) Appl. No.: 13/475,031

(22) Filed: May 18, 2012

(65) Prior Publication Data

US 2012/0295135 A1 Nov. 22, 2012

(30) Foreign Application Priority Data

May 18, 2011 (JP) .................................. 2011-111767

(51) Int. Cl.
*C08F 8/32* (2006.01)
*C08F 8/36* (2006.01)
*G11B 5/702* (2006.01)
*G11B 5/70* (2006.01)

(52) U.S. Cl.
CPC ................. *G11B 5/7013* (2013.01); *C08F 8/32* (2013.01); *C08F 8/36* (2013.01); *G11B 5/7023* (2013.01)

(58) Field of Classification Search
CPC ........... C08F 8/32; C08F 8/36; G11B 5/7013; G11B 5/7023
USPC ...................................... 525/351, 353, 327.3
See application file for complete search history.

(56) References Cited

U.S. PATENT DOCUMENTS 4,707,411 A * 11/1987 Nakayama et al. ........... 428/413
5,320,914 A    6/1994 Nakamura et al.

FOREIGN PATENT DOCUMENTS

| JP | 60-238306 A | 11/1985 |
| JP | 1-26627 B2 | 5/1989 |
| JP | 05-182176 A | 7/1993 |
| JP | 07-057242 A | 3/1995 |

OTHER PUBLICATIONS

Office Action dated Jun. 11, 2013 in Japanese Application No. 2011-111767.

* cited by examiner

*Primary Examiner* — Roberto Rabago
(74) *Attorney, Agent, or Firm* — Sughrue Mion, PLLC

(57) ABSTRACT

An aspect of the present invention relates to a method of manufacturing a vinyl polymer, which comprises: mixing a first liquid and a second liquid to conduct an addition reaction, wherein the first liquid has been obtained by reacting a sulfonic acid group-containing compound selected from the group consisting of taurine, N-methyl taurine, and meta-aminobenzenesulfonic acid with an alkali metal hydroxide in methanol, the second liquid comprises a vinyl polymer having an intramolecular epoxy group in a ketone solvent, and the addition reaction incorporates a sulfonic acid alkali metal salt group onto a side chain of the vinyl polymer.

4 Claims, No Drawings

VINYL POLYMER AND USAGE THEREOF

CROSS-REFERENCE TO RELATED APPLICATIONS

This application claims the benefit of priority under 35 USC 119 to Japanese Patent Application No. 2011-111767 filed on May 18, 2011, which is expressly incorporated herein by reference in its entirety.

BACKGROUND OF THE INVENTION

1. Field of the Invention

The present invention relates to a vinyl polymer and to a method of manufacturing the same. More particularly, the present invention relates to a vinyl polymer that is suitable as a binder in a particulate magnetic recording medium, and to a method of manufacturing the same.

Still further, the present invention relates to a binder composition for a magnetic recording medium containing the above vinyl polymer, and to a magnetic recording medium and method of manufacturing the same.

2. Discussion of the Background

In recent years, means of transmitting information at high speed have become highly developed, permitting the transmission of data and images consisting of huge amounts of information. With advances in data transmission techniques, higher density recording capability has been demanded in recording media and recording and reproduction devices for recording, reproducing, and storing information.

Employing microparticulate magnetic powder, dispersing the microparticulate powder to a high degree, and increasing the smoothness of the surface of the magnetic layer are effective ways of achieving good electromagnetic characteristics in the high-density recording region. The method of incorporating a sulfonic acid (salt) group such as a $SO_3Na$ group into the binder is a known means of increasing the dispersibility of a microparticulate magnetic powder. In the present specification and the present invention, the term "sulfonic acid (salt) group" is used to include sulfonic acid groups and salts of sulfonic acid groups.

As methods of incorporating a sulfonic acid (salt) group into a vinyl polymer that is widely employed as a binder in magnetic recording media, Japanese Examined Patent Publication (KOKOKU) Heisei No. 1-26627 (Reference 1) proposes the combined use of starting material monomers in the form of a monomer containing a sulfonic acid (salt) group and a monomer containing an epoxy group, and using an addition reaction to incorporate the monomer containing the sulfonic acid (salt) group onto the monomer containing the epoxy group. Japanese Unexamined Patent Publication (KOKAI) Showa No. 60-238306 (Reference 2) proposes the method of introducing a sulfonic acid (salt) group by conducting an addition reaction with an epoxy group-containing vinyl chloride polymer in a water-based solvent. The contents of References 1 and 2 as well as their English language family member U.S. Pat. No. 4,707,411 are expressly incorporated herein by reference in their entirety.

The vinyl polymers obtained by the methods described in References 1 and 2 have sulfonic acid (salt) groups in the form of adsorbed functional groups as side chains. When these adsorb to the surface of the magnetic powder, it becomes possible to prevent aggregation of the magnetic powder and decreased dispersibility. However, the methods described in References 1 and 2 present the following problems in terms of synthesis.

As is described in Reference 1, when an addition reaction is conducted on a monomer containing an epoxy group, a bifunctional monomer is produced. When it is used in a polymerization reaction, a vinyl polymer with a multidimensional crosslinked structure is obtained that in turn causes gelling during polymerization and the like, making it difficult to control the reaction.

Reference 2 describes conducting a sulfonic acid (salt) group addition reaction in an aqueous system. However, in cases where crosslinking using an isocyanate curing agent is employed in the magnetic recording medium to increase the coating strength and the like, and a large amount of water is present, the isocyanate curing agent crosslinks with the water, compromising reactivity with the binder. Thus, it becomes difficult to obtain a strong coating despite using an isocyanate curing agent. Accordingly, binder resins that have been synthesized in an aqueous system such as that described in Reference 2 are not employed to prepare coating liquids for forming magnetic recording media as is, but require a drying step or the like, such as is done in Examples in Reference 2, to remove the water.

As set forth above, the methods of manufacturing vinyl polymers containing sulfonic acid (salt) groups that have been previously proposed present problems in terms of synthesis.

SUMMARY OF THE INVENTION

An aspect of the present invention provides for a means of readily obtaining a vinyl polymer containing a sulfonic acid (salt) group that is suitable as a binder for use in magnetic recording media.

The present inventor conducted extensive research in this regard. As a result, he discovered that the above vinyl polymer could be obtained by mixing a first liquid, obtained by reacting a sulfonic acid group-containing compound selected from the group consisting of taurine, N-methyl taurine, and meta-aminobenzenesulfonic acid with an alkali metal hydroxide in methanol, with a second liquid, comprising a vinyl polymer having an intramolecular epoxy group (also referred to as an "epoxy group-containing vinyl polymer", hereinafter) in a ketone solvent.

Based on the above method, since the sulfonic acid (salt) group addition reaction can be conducted in the presence of non-water-based solvents in the form of methanol and a ketone solvent, use in the preparation of a coating liquid for forming a particulate magnetic recording medium was possible without separating the water from the synthesized polymer in the manner of the method described in Reference 2. Further, since a ketone solvent that is widely employed in coating liquids for forming particulate magnetic recording media accounts for a portion of the reaction solvent, the polymer liquid following the reaction can be subjected as is to the step of preparing a coating liquid for forming a particulate magnetic recording medium without solvent removal or solvent substitution. Since the polymer is subjected to an addition reaction, a sulfonic acid (salt) group-containing vinyl polymer can be readily obtained without risks such as difficulty in controlling the reaction due to the formation of a bifunctional vinyl monomer that occurs in the method described in Reference 1.

An aspect of the present invention relates to a method of manufacturing a vinyl polymer, which comprises:

mixing a first liquid and a second liquid to conduct an addition reaction, wherein the first liquid has been obtained by reacting a sulfonic acid group-containing compound selected from the group consisting of taurine, N-methyl taurine, and meta-aminobenzenesulfonic acid with an alkali metal hydroxide in methanol, the second liquid comprises a vinyl polymer having an intramolecular epoxy group in a ketone solvent, and the addition reaction incorporates a sulfonic acid alkali metal salt group onto a side chain of the vinyl polymer.

The above vinyl polymer may be a vinyl chloride polymer.

The epoxy group content in the vinyl polymer having an intramolecular epoxy group may range from 0.5 to 10.0 weight %.

The above method of manufacturing a vinyl polymer may comprise converting an alkali metal ion contained in the sulfonic acid alkali metal salt group into a proton or other cation by a salt exchange reaction.

A further aspect of the present invention relates to a vinyl polymer comprising a sulfonic acid group and/or a sulfonic acid salt group, which has been obtained by the above manufacturing method.

A still further aspect of the present invention relates to a binder composition for a magnetic recording medium, which comprises the above vinyl polymer comprising a sulfonic acid group and/or a sulfonic acid salt group.

The above binder composition for a magnetic recording medium may be a reaction liquid that has been obtained without conducting a solvent removing step following the addition reaction.

A still further aspect of the present invention relates to a magnetic recording medium comprising a magnetic layer containing a ferromagnetic powder and a binder on a nonmagnetic support, wherein the magnetic layer comprises a constituent of the binder in the form of the above vinyl polymer comprising a sulfonic acid group and/or a sulfonic acid salt group.

In the above magnetic recording medium, the magnetic layer may comprise a reaction product of a polyisocyanate and the above vinyl polymer comprising a sulfonic acid group and/or a sulfonic acid salt group.

The magnetic layer may further comprise a carboxyl group-containing compound.

The carboxyl group-containing compound may be oleic acid.

The magnetic layer may further comprise a phenol compound.

The phenol compound may be 2,3-dihydroxynaphthalene.

A still further aspect of the present invention relates to a method of manufacturing a magnetic recording medium comprising a magnetic layer containing a ferromagnetic powder and a binder on a nonmagnetic support, which comprises:

preparing a coating liquid for forming a magnetic layer with the use of the above binder composition for a magnetic recording medium; and forming the magnetic layer with the use of the coating liquid prepared, wherein the magnetic recording medium manufactured is the above magnetic recording medium.

The present invention makes it possible to readily synthesize a sulfonic acid (salt) group-containing vinyl polymer that is suitable as a binder for use in magnetic recording media. Since the sulfonic acid (salt) group-containing vinyl polymer that is obtained can be used as is to prepare a coating liquid for forming a magnetic layer without a solvent removal step following synthesis, the process of manufacturing a magnetic recording medium can be simplified.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Method of Manufacturing Vinyl Polymer

The method of manufacturing a vinyl polymer of the present invention comprises mixing a first liquid and a second liquid to conduct an addition reaction. The first liquid has been obtained by reacting a sulfonic acid group-containing compound selected from the group consisting of taurine, N-methyl taurine, and meta-aminobenzenesulfonic acid with an alkali metal hydroxide in methanol, the second liquid comprises a vinyl polymer having an intramolecular epoxy group in a ketone solvent, and the addition reaction incorporates a sulfonic acid alkali metal salt group onto a side chain of the vinyl polymer. In the method of manufacturing a vinyl polymer of the present invention, by conducting an addition reaction that adds a polar group in the form of a sulfonic acid alkali metal salt group to a polymer, it is possible to obtain a polymer containing a polar group that has an advantageous effect on the dispersion of the magnetic powder without the difficulty of controlling the reaction in the manner of the method described in Reference 1.

Further, since the reaction solvent employed is a non-water-based solvent in the form of methanol and a ketone solvent, the polymer obtained can be employed to form a magnetic layer without a water removal step in the manner of the method described in Reference 2. In the method of manufacturing a vinyl polymer of the present invention, the methanol that is employed as one of the reaction solvents is known to react with isocyanate curing agents in the same manner as the water that is present in the reaction system in the method described in Reference 2. However, methanol is a solvent with a lower boiling point and a lower heat of vaporization than water. During polymer synthesis, or during the drying step or the like when manufacturing a magnetic recording medium, it can be readily decreased or eliminated. Thus, it is advantageous from the perspective of not greatly impeding the crosslinking reaction of the isocyanate curing agent and binder.

The method of manufacturing a vinyl polymer of the present invention will be described in greater detail below.

Preparation of the First Liquid

The first liquid is a reaction liquid that is obtained by reacting a sulfonic acid group-containing compound selected from the group consisting of taurine, N-methyl taurine, and meta-aminobenzenesulfonic acid with an alkali metal hydroxide in methanol. Taurine, N-methyl taurine, and meta-aminobenzenesulfonic acid are compounds that are employed to incorporate a polar group into the binder resin for use in the magnetic recording medium. However, they have poor solubility for organic solvents, and their use has conventionally been limited to aqueous systems such as that described in Reference 2.

By contrast, in the present invention, a polar group in the form of a sulfonic acid alkali metal salt group can be incorporated into the vinyl polymer without the use of a water-based solvent. That is presumed to be because taurine, N-methyl taurine, and meta-aminobenzenesulfonic acid undergo a salt-forming reaction with the alkali metal hydroxide in methanol containing an alkali metal hydroxide, assuming the state of a salt and thus readily dissolving in methanol. The methanol (first liquid) that contains the above salt is then mixed with the second liquid containing an epoxy group-containing vinyl polymer in a ketone solvent to cause the salt to undergo an addition reaction with the epoxy group. As a result, the sulfonic acid alkali metal salt group can be incorporated onto a side chain of the vinyl polymer. Aminobenzenesulfonic acid comes as ortho, meta, and para-aminobenzenesulfonic acid. However, based on investigation by the present inventor, when ortho-aminobenzenesulfonic acid and para-aminobenzenesulfonic acid were employed, an insoluble precipitate was produced following mixing of the first and second liquids, making it impossible to obtain the targeted polymer. Accordingly, the aminobenzenesulfonic acid that is employed to prepare the first liquid in the present invention is meta-aminobenzenesulfonic acid.

The first liquid can be prepared by admixing with stirring a sulfonic acid group-containing compound selected from the group consisting of taurine, N-methyl taurine, and meta-aminobenzenesulfonic acid and an alkali metal hydroxide in methanol. The reaction (salt-forming reaction) of the sulfonic acid group-containing compound and the alkali metal hydroxide is thus induced, which is thought to form a salt that is soluble in methanol. The temperature of the reaction liquid during the reaction is desirably equal to or higher than 0° C. from the perspective of the reaction speed, and desirably equal to or lower than the boiling point of methanol. When the reaction is conducted at a temperature exceeding the boiling point of methanol, it is desirable to suitably employ operations so that low-boiling-point materials do not volatize, such as using a cooling tube or sealing the tube. It suffices to suitably set the reaction time to within a range that allows the reaction to adequately progress. For example, it can be set to from about 30 minutes to about 16 hours.

As set forth above, the alkali metal hydroxide employed to prepare the first liquid is presumed to undergo a salt-forming reaction with the sulfonic acid group-containing compound in methanol. The alkali metal hydroxide employed can be in the form of potassium hydroxide, sodium hydroxide, lithium hydroxide, or the like. These alkali metal hydroxides can be employed singly or in combinations of two or more.

From the perspective of preventing precipitation of the vinyl polymer and decreased reactivity in the course of mixing the first and second liquids due to the methanol that is contained in the first liquid being a poor solvent for vinyl polymers, the first liquid desirably contains a high concentration of the sulfonic acid group-containing compound. Specifically, the concentration of the sulfonic acid group-containing compound employed to prepare the first liquid is desirably equal to or higher than 1 weight %. Taking into account the solubility in methanol of the salt that is formed by the sulfonic acid group-containing compound and the alkali metal hydroxide, the concentration is desirably equal to or lower than 25 weight %. Accordingly, from these perspectives, the concentration of the sulfonic acid group-containing compound in the first liquid is desirably 1 to 25 weight %.

A salt is formed by reacting an alkali metal hydroxide and a sulfonic acid group-containing compound in equal quantities. However, it is also possible to employ either the sulfonic acid group-containing compound or the alkali metal hydroxide in an excess quantity. When the alkali metal hydroxide is employed in a quantity of less than 1.0 equivalent relative to the sulfonic acid group-containing compound, that is, when the sulfonic acid group-containing compound is employed in an excess quantity, from the perspective of the ease of removing unreacted sulfonic acid group-containing compound following the reaction, the quantity of alkali metal hydroxide employed is desirably equal to or greater than 0.50 equivalent relative to the sulfonic acid group-containing compound. Additionally, when employing the alkali metal hydroxide in an excess quantity, taking into account the ease of removing unreacted alkali metal hydroxide following the reaction, the quantity of alkali metal hydroxide employed is desirably equal to or less than 2.0 equivalents relative to the sulfonic acid group-containing compound. The quantity of alkali metal hydroxide employed preferably falls within a range of 0.50 to 1.5 equivalents relative to the sulfonic acid group-containing compound when the reactivity and ease of removal are considered.

Preparation of the Second Liquid

The second liquid that is mixed with the above first liquid contains an epoxy group-containing vinyl polymer in a ketone solvent.

Ketone solvents such as methyl ethyl ketone and cyclohexanone are widely employed as solvents in coating liquids for forming particulate magnetic recording media. That is because ketone solvents have relatively low boiling points. Thus, the use of a ketone solvent permits the ready removal of the solvent during the drying step and the obtaining of a magnetic recording medium with little residual solvent. Accordingly, it is desirable for a ketone solvent to constitute some portion of the reaction solvent in the reaction to prepare a binder for use in a magnetic recording medium. That is because the polymer liquid can be subjected to a process of preparing a coating liquid for forming a particulate magnetic recording medium without undergoing steps to effect a high degree of separation and purification following the reaction. In the method of manufacturing a vinyl polymer of the present invention, as set forth above, the reaction solvent contains methanol contained in the first liquid and the ketone solvent contained in the second liquid. Since a ketone solvent accounts for a portion of the reaction liquid, the vinyl polymer that is obtained is suited to the preparation of a particulate magnetic recording medium. The methanol originating in the first liquid is desirable because it is highly safe. Since it has a low melting point, it is normally removed in the course of conducting an addition reaction by mixing the first and second liquids. Thus, it is desirable from the perspective of not presenting a risk of increasing the quantity of residual solvent. Even if some methanol were to remain in the binder liquid, it would normally volatize in the step of preparing a magnetic recording medium. Thus, methanol is desirable from the perspective of not having a major effect on the media properties or the reactivity of the crosslinking reaction between the isocyanate compound and the binder.

Examples of the ketone solvent employed in the second liquid are acetone, methyl ethyl ketone, and cyclohexanone. These can be employed singly, or mixed in any ratio for use.

The epoxy group-containing vinyl polymer is desirably a vinyl chloride polymer from the perspective of availability. In the present invention, the epoxy group-containing vinyl polymer that is employed to prepare the second liquid can be synthesized by known methods or obtained as a commercial product. The epoxy group can be incorporated onto the main chain, onto a side chain, or onto both the main chain and a side Introduction of the Sulfonic Acid Alkali Metal Salt Group (Addition Reaction)

The details of the first and second liquids are as set forth above. In the manufacturing method of the present invention, the first and second liquids that have been prepared are mixed to introduce the sulfonic acid alkali metal salt group onto a side chain of the epoxy group-containing vinyl polymer that is contained in the second liquid. This (addition) reaction is thought to proceed with the amino group of the sulfonic acid group-containing compound selected from the group consisting of taurine, N-methyl taurine, and meta-aminobenzenesulfonic acid attacking the epoxy group and opening the ring of the epoxy group to effect the addition.

An addition reaction also takes place on the epoxy group-containing monomer in Reference 1. However, in that case, a reaction such as that set forth below occurs, producing a monofunctional vinyl monomer and a bifunctional vinyl monomer.

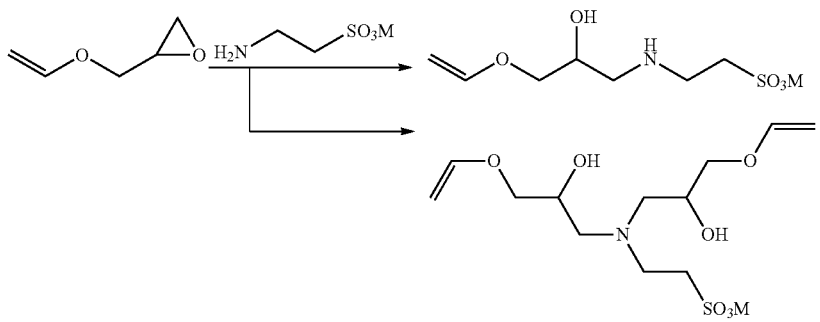

chain in the vinyl polymer. From the perspective of introducing by an addition reaction a polar group in a quantity that will effectively contribute to enhancing the dispersibility of the magnetic powder, and from the perspective of reducing the environmental burden due to dechlorination that is presented by the vinyl chloride polymer, the epoxy group content in the polymer desirably falls within a range of 0.5 to 10.0 weight % relative to the weight of a single polymer molecule. The content of the sulfonic acid alkali metal salt group in the vinyl polymer that is obtained by the manufacturing method of the present invention, or of a polar group that is salt exchanged for it, is desirably 10 to 1,000 µeq/g from the perspective of enhancing dispersibility.

Reference can be made to the entire descriptions of References 1 and 2, for example, for methods of synthesizing the epoxy group-containing vinyl polymer that is employed to prepare the second liquid. Commercial products that can be employed are MR-104 from Zeon Corp., MR-104 from Kaneka Corp., MR-110 from Zeon Corp., MR-110 from Kaneka Corp., and the like.

The second liquid can be readily prepared by adding the epoxy group-containing vinyl polymer to the ketone solvent. The concentration of the epoxy group-containing vinyl polymer in the second liquid is desirably one that allows the epoxy group-containing vinyl polymer to dissolve well, preferably completely, into the ketone solvent so that the addition reaction progresses smoothly when added to the first liquid. Specifically, a concentration of about 10 to about 60 weight % is suitable. A concentration of 20 to 40 weight % is preferable because it permits use in the manufacturing of a magnetic recording medium without adjusting the concentration following the conclusion of the addition reaction, described further below.

When a polymerization reaction is conducted with the monomer mixture thus obtained, the vinyl polymer obtained is imparted with a multidimensional crosslinked structure and has a molecular weight that is difficult control. The —NH— group of the upper stage monofunctional vinyl monomer becomes a starting point for a new addition reaction, also making it difficult to control the molecular weight.

By contrast, in the manufacturing method of the present invention, an addition reaction is conducted on the polymer as set forth above. Thus, control of the molecular weight is not complicated by the production of a bifunctional vinyl monomer, and, due to stearic hindrance of the main chain of the polymer, the —NH— group produced by the addition reaction does not become the starting point of a new addition reaction with the epoxy group. Accordingly, the present invention makes it possible to conduct a polar group addition reaction without concern for the difficulty of controlling the molecular weight in the manner of Reference 1.

The mixing ratio of the first and second liquids is desirably determined based on the solubility of the sulfonic acid group-containing compound contained in the first liquid, the solubility of the epoxy group-containing vinyl polymer contained in the second liquid, the number of epoxy groups present in the epoxy group-containing vinyl polymer, and the number of polar groups that can effectively contribute to enhancing the dispersibility of the magnetic powder. Specifically, the ratio of the first liquid to the second liquid, the first liquid: the second liquid, is desirably from 1:1 to 1:100 (volumetric ratio). The range of the ratio of the first liquid to the second liquid is preferably from 1:5 to 1:100 (volumetric ratio) from the perspectives of the solubility of the vinyl polymer and the removal of methanol following the reaction.

The methanol contained in the first liquid can be readily removed as set forth above. However, with the goal of increasing the coating strength, when preparing a coating liquid for use in fabricating a magnetic recording medium containing an isocyanate curing agent, the quantity of residual methanol is desirably small from the perspective of maintaining good reactivity of the isocyanate compound and binder. Accordingly, in the method of manufacturing a vinyl polymer of the present invention, as needed, it is possible to conduct an operation to remove methanol during the addition reaction or once the reaction has ended. The methanol can be removed by reducing the pressure, heating the reaction liquid to or above the boiling point of methanol, or a combination of the two, for example. When reducing the pressure to remove methanol, a reduction in pressure to about 5 to about 100 mmHg is desirable. These methods of removing methanol can be much more easily conducted than the removal of water that is necessary in the method described in Reference 2, so the manufacturing process is not rendered complex. When the ketone solvent is also removed in the methanol removing step, the ketone solvent can be added at any time. The reaction can be conducted in air, or in an atmosphere of a gas that is inert with respect to the reaction, such as nitrogen or argon. The reaction time can be suitably set to within a range that allows the reaction to adequately progress, such as about 2 hours to about 24 hours, for example. Heating the reaction liquid to about 40° C. to about 80° C. during the reaction is desirable to facilitate progress of the reaction. A known catalyst can be employed to promote the addition reaction.

In the vinyl polymer in which the sulfonic acid alkali metal salt group has been incorporated onto a side chain by the addition reaction, the alkali metal ion contained in the sulfonic acid alkali metal salt group can be optionally converted into a proton or some other cation by a known salt exchange reaction.

The vinyl polymer having a sulfonic acid alkali metal salt group or a salt exchange product thereof on a side chain can be employed to prepare a coating liquid for forming the magnetic layer of a particulate magnetic recording medium through a known purification process. Since the reaction solvents employed in the manufacturing method of the present invention are a ketone solvent that is widely employed in the preparation of coating liquids for forming particulate magnetic recording media and methanol, which is readily removable, as set forth above, even when the reaction liquid following the addition reaction is employed to prepare a coating liquid for forming the magnetic layer of a particulate magnetic recording medium without conducting a solvent removing step, the quality of the magnetic recording medium that is fabricated is not compromised. When employing a coating liquid for forming a magnetic layer containing an isocyanate curing agent, the quantity of methanol in the resin liquid is desirably less than 1 weight %. Accordingly, to further reduce the quantity of methanol, it is sometimes desirable to subject the reaction liquid following the addition reaction to the above-described methanol removing step. A filtering step can also be optionally implemented to remove unreacted material and insoluble material. Thus, the present invention can yield a polymer liquid that can be used to prepare a coating liquid for forming the magnetic layer of a particulate magnetic recording medium without a complex step to remove water, thereby simplifying the process of manufacturing a particulate magnetic recording medium.

Details of the molecular weight of the vinyl polymer obtained by the manufacturing method of the present invention are as follows. From the perspective of obtaining a high-strength coating, the weight average molecular weight is desirably equal to or higher than 20,000, and from the perspective of keeping the coating liquid viscosity to within a suitable range at a prescribed concentration to maintain good handling properties, it is preferably equal to or lower than 200,000. The molecular weight of the vinyl polymer obtained by the manufacturing method of the present invention can be chiefly determined by the molecular weight of the epoxy group-containing vinyl polymer employed in the second liquid. Thus, it is desirable to prepare the second liquid by selecting an epoxy group-containing vinyl polymer having a molecular weight that is suited to obtaining the targeted polymer of desired molecular weight in the present invention.

Sulfonic Acid (Salt) Group-Containing Vinyl Polymer and Binder Composition for Magnetic Recording Medium Containing the Same The present invention further relates to a sulfonic acid (salt) group-containing vinyl polymer obtained by the manufacturing method of the present invention set forth above, and a binder composition for a magnetic recording medium containing the above sulfonic acid (salt) group-containing vinyl polymer.

The sulfonic acid (salt) group-containing vinyl polymer of the present invention contains a sulfonic acid (salt) group in the form of an adsorbing functional group, and thus can contribute to raising the dispersibility of the magnetic powder. The binder composition for a magnetic recording medium of the present invention can be obtained by a step of filtering the reaction product following the above addition reaction to remove unreacted material and insoluble material. A step of removing at least a portion of the reaction solvent can also be conducted. However, since the solvents employed in the method of manufacturing a vinyl polymer of the present invention are methanol and a ketone solvent, as set forth above, the reaction liquid can be employed as a binder composition for a magnetic recording medium without being subjected to a solvent removing step following the addition reaction. For example, a ferromagnetic powder and various additives can be mixed with the reaction liquid that has been obtained following the addition reaction, and as needed, an organic solvent (such as a ketone solvent or toluene) can be added to prepare a coating liquid for forming a magnetic layer. In the magnetic layer that is formed using the coating liquid, the sulfonic acid (salt) group-containing vinyl polymer of the present invention can disperse the ferromagnetic powder to a high degree, thereby yielding a magnetic recording medium having a high degree of surface smoothness that is suited to high-density recording applications. By further employing a polyisocyanate as a magnetic layer component, a crosslinked structure can be formed between the sulfonic acid (salt) group-containing vinyl polymer and polyisocyanate by a heat treatment during formation of the magnetic layer, thereby forming a high-strength magnetic layer. Since the addition reaction to incorporate a polar group into the sulfonic acid (salt) group-containing vinyl polymer of the present invention is conducted in a non-aqueous system, even when the reaction liquid is used to prepare a magnetic layer coating liquid as is following the addition reaction, it is desirable for the formation of the crosslinked structure not to be impeded by the presence of water. The details of the polyisocyanate employed are set forth further below.

Magnetic Recording Medium and Method of Manufacturing the Same

The present invention further relates to a magnetic recording medium comprising a magnetic layer containing a ferromagnetic powder and a binder on a nonmagnetic support. In the magnetic recording medium of the present invention, the magnetic layer contains the above sulfonic acid (salt) group-containing vinyl polymer as a constituent of the binder. In this context, the phrase "contains . . . as a constituent" refers to forms in which the sulfonic acid (salt) group-containing vinyl polymer of the present invention itself is present as a binder in the magnetic layer, and forms in which the polymer is present as a reaction product with another component. For example, the sulfonic acid (salt) group-containing vinyl polymer of the present invention can be present in the magnetic layer in a state in which a crosslinked structure has been formed by reacting it with a polyisocyanate; such forms are covered by the present invention. From the perspective of enhancing the coating strength, the polyisocyanate is desirably a trifunctional or higher polyisocyanate. Specific examples of trifunctional and higher polyisocyanates are a compound obtained by adding three moles of trilene diisocyanate (TDI) to trimethylolpropane (TMP); a compound obtained by adding three moles of hexamethylene diisocyanate (HDI) to TMP, a compound obtained by adding three moles of isophorone diisocyanate (IPDI) to TMP, a compound obtained by adding three moles of xylene diisocyanate (XDI) to TMP, and other adduct-type polyisocyanate compounds; a condensed isocyanurate trimer of TDI, a condensed isocyanurate pentamer of TDI, a condensed isocyanurate heptamer of TDI, and a mixture thereof; an isocyanurate condensate of HDI; an isocyanurate condensate of IPDI, and crude MDI. The quantity of polyisocyanurate employed can be 0 to 80 weight parts per 100 weight parts of the vinyl polymer of the present invention, for example. From the perspective of enhancing coating strength, it is desirably 10 to 40 weight parts.

The present invention further relates to a method of manufacturing the magnetic recording medium of the present invention set forth above. The method of manufacturing a magnetic recording medium of the present invention comprises: preparing a coating liquid for forming a magnetic layer with the use of the binder composition for a magnetic recording medium of the present invention; and forming the magnetic layer with the use of the coating liquid prepared. As set forth above, it is possible to simplify the process of manufacturing a magnetic recording medium by using the reaction liquid, without conducting a solvent removing step following the reaction to introduce the polar group into the vinyl polymer, as the binder composition for a magnetic recording medium of the present invention.

In addition to the above vinyl polymer of the present invention, the magnetic recording medium of the present invention can contain constituents of the magnetic layer binder in the form of known thermoplastic resins, thermosetting resins, reactive resins, mixtures thereof, and other resin components. When the vinyl polymer of the present invention is employed in combination with another resin component, from the perspective of effectively enhancing dispersion by means of the vinyl polymer of the present invention, the content of the other resin component employed is desirably 1 to 100 weight parts, preferably 10 to 100 weight parts, per 100 weight parts of the vinyl polymer of the present invention.

Specific embodiments of the magnetic recording medium and the method of manufacturing the same of the present invention will be described in greater detail below.

Magnetic Layer (i) Ferromagnetic Powder

Acicular ferromagnetic powder, platelike magnetic powder, spherical magnetic powder, or elliptical magnetic powder can be employed as the ferromagnetic powder contained in the magnetic layer. From the perspective of high-density recording, the average major axis length of the acicular ferromagnetic powder is desirably equal to or greater than 20 nm but equal to or lower than 50 nm and preferably equal to or greater than 20 nm but equal to or lower than 45 nm. The average plate diameter of the platelike magnetic powder is preferably equal to or greater than 10 nm but equal to or less than 50 nm as a hexagonal plate diameter. When employing a magnetoresistive head in reproduction, a plate diameter equal to or less than 40 nm is desirable to reduce noise. A plate diameter within the above range can yield stable magnetization without the effects of thermal fluctuation, and permit low noise, that is suited to the high-density magnetic recording. From the perspective of high-density recording, the average diameter of the spherical magnetic powder or elliptical magnetic powder is desirably equal to or greater than 10 nm but equal to or lower than 50 nm.

The average particle size of the ferromagnetic powder can be measured by the following method.

Particles of ferromagnetic powder are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle sizes measured by the above method is adopted as an average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter).

Reference can be made to [0097] to [0110] of Japanese Unexamined Patent Publication (KOKAI) No. 2009-96798, which is expressly incorporated herein by reference in its entirety, for the details of the above-described magnetic powders.

(ii) Dispersing Agents

Since the magnetic recording medium of the present invention contains the vinyl polymer of the present invention comprising a sulfonic acid (salt) group as a constituent of the binder in the magnetic layer, a high degree of dispersion of ferromagnetic powder can be achieved in the magnetic layer. To enhance dispersion of the ferromagnetic powder even more, a dispersing agent can be employed. In the present invention, the term "dispersing agent" means a compound that has the effect when present of enhancing the dispersion of ferromagnetic powder in the magnetic layer relative to when absent. Examples of desirable dispersing agents that can be employed are carboxyl group-containing compounds and aromatic compounds, and examples of preferred dispersing agents are carboxyl group-containing compounds in the form of fatty acids, and aromatic compounds in the form of aromatic carboxylic acid compounds and phenol compounds.

The fatty acids can be saturated or unsaturated fatty acids. From the perspective of enhancing dispersibility, unsaturated fatty acids are desirable. The number of carbon atoms in the fatty acid is desirably 14 to 24, preferably 16 to 22. Specific examples of fatty acids are oleic acid, elaidic acid, and erucic acid. Of these, oleic acid is desirable from the perspective of further enhancing dispersion.

The term "aromatic carboxylic acid compound" means a compound in which at least one of the hydrogens bonded to an aromatic ring has been substituted with a carboxylic acid group, and includes those in which carboxylic acid has been substituted onto naphthalene or some other condensed polycyclic aromatic compound. From the perspective of further enhancing dispersion, a compound containing an aromatic ring in the form of a benzene ring, naphthalene ring, or biphenyl ring is desirable as an aromatic carboxylic compound. Specific desirable examples are 1-naphthoic acid, trans-cinnamic acid, and 4-biphenylcarboxylic acid.

The term "phenol compound" desirably means a compound in which at least one of the hydrogens bonded to an aromatic ring has been substituted with hydroxyl group, and includes naphthalene or some other condensed polycyclic aromatic compound onto which a hydroxyl group has been substituted. From the perspective of further enhancing dispersion, the phenol compound is desirably one containing an aromatic ring in the form of a benzene ring or naphthalene ring. Specific desirable examples are phenol, catechol, hydroxynaphthalene, dihydroxynaphthalene, and 4-t-butylphenol. Specific preferred examples are chelate-form divalent phenol compounds. Specific desirable examples of chelate-form divalent phenol compounds are catechol and dihydroxynaphthalene. A specific preferred example is 2,3-dihydroxynaphthalene.

The magnetic layer of the magnetic recording medium of the present invention desirably contains equal to or more than 1.5 weight parts of a dispersing agent per 100 weight parts of ferromagnetic powder from the perspective of enhancing dispersion. From the perspective of increasing the recording density, it is desirable to raise the fill rate of the ferromagnetic powder. Thus, the quantity of additives that are added is desirably reduced within the scope at which they produce their effect. From this perspective, the content of dispersing agent in the magnetic layer is desirably equal to or less than 10 weight parts per 100 weight parts of ferromagnetic powder. From the perspective of achieving both a good fill rate and dispersion of the ferromagnetic powder, the content of a dispersing agent in the magnetic layer is preferably 3 to 10 weight parts per 100 weight parts of ferromagnetic powder.

(ii) Additives

In addition to the dispersing agent, additives may be added to the magnetic layer as needed. Examples of such additives are: abrasives, lubricants, dispersing adjuvants, antifungal agents, antistatic agents, oxidation inhibitors, and solvents. Reference can be made to [0111] to [0115] of Japanese Unexamined Patent Publication (KOKAI) No. 2009-96798 for the details, such as specific examples, of the additives.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 100 to 500 $m^2/g$ (more preferably 150 to 400 $m^2/g$), the DBP oil absorption capacity is 20 to 400 ml/100 g (more preferably 30 to 200 ml/100 g), the particle diameter is 5 to 80 nm (more preferably 10 to 50 nm), the pH is 2 to 10, the moisture content is 0.1 to 10 percent, and the tap density is 0.1 to 1 g/ml. For example, the Carbon Black Handbook compiled by the Carbon Black Association, which is expressly incorporated herein by reference in its entirety, may be consulted for types of carbon black suitable for use in the magnetic layer. These carbon blacks are commercially available.

The types and quantities of the additives employed in the magnetic layer may differ from those employed in the nonmagnetic layer, described further below, in the present invention. All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

Nonmagnetic Layer

The magnetic recording medium of the present invention can comprise a magnetic layer directly on a nonmagnetic support, or a nonmagnetic layer containing a nonmagnetic powder and a binder between the nonmagnetic support and the magnetic layer. The vinyl polymer of the present invention set forth above can be employed as the resin component constituting the binder in the nonmagnetic layer, or some other resin component such as a known thermoplastic resin, thermosetting resin, reactive resin, or some combination thereof can be employed.

The nonmagnetic powder can be an organic or inorganic substance. Examples of inorganic substances are: metals, metal oxides, metal carbonates, metal sulfates, metal nitrides, metal carbides, and metal sulfides. Carbon black may also be employed. These nonmagnetic powders are commercially available and can be manufactured by known methods.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped.

The crystallite size of the nonmagnetic powder preferably ranges from 4 nm to 1 μm, more preferably from 40 to 100 nm. The crystallite size within 4 nm to 1 μm can achieve good dispersibility and suitable surface roughness.

The average particle diameter of the nonmagnetic powder preferably ranges from 5 nm to 2 μm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Reference can be made to [0123] to [0132] of Japanese Unexamined Patent Publication (KOKAI) No. 2009-96798 for the nonmagnetic powder suitable for use in the magnetic recording medium of the present invention.

Carbon black may be combined with the nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 kg/mm$^2$ and desirably 30 to 50 kg/mm$^2$ to adjust head contact. It can be measured with a thin-film hardness meter (HMA-400 made by NEC) employing a diamond triangular needle with a tip radius of 0.1 μm and an edge angle of 80 degrees as indenter tip. The light transmittance is generally standardized to an infrared absorbance at a wavelength of about 900 nm of equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is desirably 100 to 500 m$^2$/g, preferably 150 to 400 m$^2$/g. The DBP oil absorption capability is desirably 20 to 400 mL/100 g, preferably 30 to 200 mL/100 g. The particle diameter of the carbon black is preferably 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL. For example, the *Carbon Black Handbook* compiled by the Carbon Black Association, which is expressly incorporated herein by reference in its entirety, may be consulted for types of carbon black suitable for use in the nonmagnetic layer. These carbon blacks are commercially available.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersion agents employed in the magnetic layer may be adopted thereto.

Nonmagnetic Support

A known film such as a biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

Backcoat Layer

Generally, a magnetic tape used for computer data recording will be required to have better repeat running properties than a video tape or an audio tape. To maintain such a high degree of storage stability, a backcoat layer can be provided on the opposite surface of the nonmagnetic support from the surface on which the magnetic layer is provided. The backcoat layer coating liquid can be formed by dispersing particulate components such as an abrasive, an antistatic agent, and the like and binder in an organic solvent. Various inorganic pigments, carbon black, and the like can be employed as the particulate components. Resins such as nitrocellulose, phenoxy resin, vinyl chloride resin, and polyurethane can be employed singly or in combination as the binder. The vinyl chloride polymer of the present invention can be used to form the backcoat layer.

Layer Structure

In the magnetic recording medium of the present invention, the thickness of the nonmagnetic support desirably ranges from 3 to 80 μm. When a smoothing layer is provided between the nonmagnetic support and the nonmagnetic layer or the magnetic layer, the thickness of the smoothing later desirably ranges from 0.01 to 0.8 μm, and preferably 0.02 to 0.6 μm. The thickness of the above backcoat layer is, for example, 0.1 to 1.0 μm, and desirably 0.2 to 0.8 μm.

The thickness of the magnetic layer is desirably optimized based on the saturation magnetization of the head employed, the length of the head gap, and the recording signal band, and is desirably 10 nm to 100 nm, preferably 20 nm to 80 nm, for achieving high capacity. At least one magnetic layer is sufficient. The magnetic layer may be divided into two or more layers having different magnetic characteristics, and a known configuration relating to multilayered magnetic layer may be applied.

The thickness of the nonmagnetic layer is desirably 0.2 to 3.0 μm, preferably 0.3 to 2.5 μm, and further preferably, 0.4 to 2.0 μm. When the magnetic recording medium of the present invention has a nonmagnetic layer, the nonmagnetic layer is effective so long as it is substantially nonmagnetic. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT (100 G), or a coercivity of equal to or less than 7.96 kA/m (100 Oe), it being preferable not to have a residual magnetic flux density or coercivity at all.

Manufacturing Method

The process of manufacturing a coating liquid for forming the various layers of the magnetic layer, nonmagnetic layer, and the like is desirably comprised of at least a kneading step, a dispersing step, and mixing steps provided as needed before and after these steps. Each of the various steps can be divided into two or more stages. The starting materials such as ferromagnetic powder, nonmagnetic powder, binder, carbon black, abrasive, antistatic agents, lubricants, and solvents that are employed in the present invention can be added at the outset or part way through any of the steps. The various starting materials can also be divided up and added during two or more steps.

It is possible to manufacture a coating liquid by adding the above starting materials to the binder composition for a magnetic recording medium of the present invention either simultaneously or sequentially. For example, following comminution of the ferromagnetic powder in a kneader, the binder resin composition for a magnetic recording medium of the present invention (and any other binder components being optionally employed in combination) can be added and a kneading step can be conducted. Various additives can be added to the kneaded product and a dispersion step can be conducted to prepare a coating liquid for forming a magnetic layer.

To prepare coating liquids for forming the various layers, conventionally known manufacturing techniques may be utilized for some of the steps. A kneader having a strong kneading force, such as an open kneader, continuous kneader, pressure kneader, or extruder is preferably employed in the kneading step. When a kneader is employed, the binder (preferably equal to or higher than 30 weight percent of the entire quantity of binder) can be kneaded in a range of 15 to 500 parts per 100 parts of the ferromagnetic powder or nonmagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating liquids for magnetic and nonmagnetic layers. Other than glass beads, dispersing media with a high specific gravity such as zirconia beads, titania beads, and steel beads are suitable for use. The particle diameter and fill ratio of these dispersing media can be optimized for use. A known dispersing device may be employed.

In the method of manufacturing a magnetic recording medium, for example, a magnetic layer can be formed by coating a magnetic layer coating liquid to a prescribed thickness on the surface of a nonmagnetic support that is being run. Multiple magnetic layer coating liquids can be successively or simultaneously coated in a multilayer coating, or a nonmagnetic layer coating liquid and a magnetic layer coating liquid can be successively or simultaneously coated in a multilayer coating. Coating machines suitable for use in coating the coating liquid for each layer are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K. may be referred to in this regard. The content of the above publication is expressly incorporated herein by reference in its entirety. For the details regarding the coating process, reference can also be made to paragraphs [0067] and [0068] of Japanese Unexamined Patent Publication (KOKAI) No. 2004-295926, which is expressly incorporated herein by reference in its entirety.

Following the coating step, the medium can be subjected to various post-processing such as drying, magnetic layer orientation, and surface smoothing (calendering). For details regarding such processing, reference can be made to paragraphs [0070] to [0073] of Japanese Unexamined Patent Publication (KOKAI) No. 2004-295926.

When polyisocyanate is employed to enhance the coating strength as set forth above, heating during the drying and calendering processes can form a crosslinked structure. To form a high-strength coating, a heat treatment in addition to the above processing is desirable. In that case, the heat treatment is, for example, a heating temperature of 35 to 100° C., desirably 50 to 80° C. The duration of the heat treatment is, for example, 12 to 72 hours, desirably 24 to 48 hours.

The magnetic recording medium that is obtained can be cut to desired size with a cutter, punch, or the like for use.

EXAMPLES

The present invention will be described in detail below based on Examples. However, the present invention is not limited to Examples. The following operations were conducted at room temperature (25° C.) unless specifically stated otherwise.

1. Examples and Comparative Examples of Preparation of the Sulfonic Acid (Salt) Group-Containing Vinyl Polymer Example 1

To 5.7 weight parts of methanol were added 1.0 weight part of taurine (2-aminoethanesulfonic acid) and 0.5 weight part of potassium hydroxide and the mixture was stirred for one hour (preparation of first liquid).

To the first liquid was added a liquid (the second liquid) comprised of 100.0 weight parts of epoxy group-containing vinyl chloride copolymer (MR104 made by Zeon Corp.) and 233.3 weight parts of cyclohexanone, after which the mixture was stirred for 5 hours while maintaining an internal temperature of 40 to 60° C. Next, the reaction liquid was stirred for 30 minutes under conditions of a reduced pressure of 100 mmHg to obtain resin liquid A.

Evaluation of the Resin Liquid
(1) Determination of the Presence or Absence of Residual Methanol Analysis of a portion of resin liquid A obtained in Example 1 by gas chromatography under the following conditions detected no methanol (the level was below the detection threshold). Thus, methanol originating in the first liquid was determined to have been removed by volatizing during the reaction.

Detector: Shimadzu GC-17A
Column: Agilent Technologies DB-5MS (30 m×0.25 mm×0.25 μm)
Column temperature: 40° C.
Test vaporization temperature: 100° C.
Detector portion temperature: 250° C.
Quantity of sample injected: 1 μL
Temperature rate: 40° C./6 min→temperature rise 30° C./min→210° C./8 min (2) Determination of Quantity of Sulfonic Acid Salt Groups Incorporated into Vinyl Polymer One weight part of acetone was added at an internal temperature of 50° C. to one weight part of resin liquid A obtained in Example 1. Subsequently, when 2.5 weight parts of a mixed liquid of methanol:water=1:1 were added dropwise at an internal temperature range of 45 to 55° C., a solid material precipitated. The solid material that precipitated was filtered out, 1.5 weight parts of acetone were added, and the mixture was fully dissolved by stirring at 50° C. When 2.5 weight parts of a mixed liquid of methanol:water=1:1 were added dropwise at an internal temperature range of 45 to 55° C., a solid material precipitated. The solid material that precipitated was filtered out and the product was dried for 24 hours at 30° C. under a vacuum.

The sulfur content of the product obtained by the above operations was quantified from the area of the peak of elemental sulfur (S) by fluorescence X-ray analysis as 150 meq/g. Based on the unreacted epoxy group-containing vinyl chloride copolymer and the change in the sulfur content relative to resin liquid A following the conclusion of the reaction, the quantity of sulfonic acid salt groups incorporated by the reaction was calculated as 80 meq/g. The product (dry powder) obtained by the above operations was dissolved in deuterated chloroform and the absence of undissolved material was confirmed. In addition, the deuterated chloroform solution was measured by H-NMR and the absence of a peak derived from taurine in the vicinity of 2 to 3 ppm was confirmed.

Based on the above results, the quantity of sulfonic acid salt groups that were incorporated into the vinyl polymer by the reaction was determined to be 80 meq/g.

Example 2

To 5.5 weight parts of methanol were added 1.0 weight part of taurine and 0.5 weight part of potassium hydroxide and the mixture was stirred for one hour (preparation of first liquid).

To the first liquid that had been prepared was added a liquid (the second liquid) comprised of 53.6 weight parts of epoxy group-containing vinyl chloride copolymer (MR104 made by Zeon Corp.) and 125.0 weight parts of cyclohexanone, after which the mixture was stirred for 5 hours while maintaining an internal temperature of 40 to 60° C. Next, the reaction liquid was stirred for 30 minutes under conditions of a reduced pressure of 100 mmHg to obtain resin liquid B.

When the methanol contained in the resin liquid B that was obtained was analyzed by the above method, the level was below the detection threshold.

One weight part of acetone was added at an internal temperature of 50° C. to one weight part of resin liquid B. Subsequently, when 2.5 weight parts of a mixed solution of methanol:water=1:1 were added dropwise at an internal temperature range of 45 to 55° C., a solid material precipitated. The solid material that precipitated was filtered out, 1.5 weight parts of acetone were added, and the mixture was fully dissolved by stirring at 50° C. When 2.5 weight parts of a mixed solution of methanol:water=1:1 were added dropwise at an internal temperature range of 45 to 55° C., a solid material precipitated. The solid material that precipitated was filtered out and the product was dried for 24 hours at 30° C. under a vacuum.

The sulfur content of the product obtained by the above operations was quantified from the area of the peak of elemental sulfur (S) by fluorescence X-ray analysis as 200 meq/g. Based on the unreacted epoxy group-containing vinyl chloride copolymer and the change in the sulfur content relative to resin liquid B following the conclusion of the reaction, the quantity of sulfonic acid (salt) groups incorporated by the reaction was calculated as 130 meq/g. The product (dry powder) obtained by the above operations was dissolved in deuterated chloroform and the absence of undissolved material was confirmed. In addition, the deuterated chloroform solution was measured by H-NMR and the absence of a peak derived from taurine in the vicinity of 2 to 3 ppm was confirmed.

Based on the above results, the quantity of sulfonic acid salt groups that were incorporated into the vinyl polymer by the reaction was determined to be 130 meq/g.

Example 3

To 6.3 weight parts of methanol were added 1.0 weight part of taurine and 0.5 weight part of potassium hydroxide and the mixture was stirred for one hour (preparation of first liquid).

To the first liquid that had been prepared was added a liquid (the second liquid) comprised of 37.5 weight parts of epoxy group-containing vinyl chloride copolymer (MR104 made by Zeon Corp.) and 87.5 weight parts of cyclohexanone, after which the mixture was stirred for 5 hours while maintaining an internal temperature of 40 to 60° C. Next, the reaction liquid was stirred for 30 minutes under conditions of a reduced pressure of 100 mmHg to obtain resin liquid C.

When the methanol contained in the resin liquid C that was obtained was analyzed by the above method, the level was below the detection threshold.

One weight part of acetone was added at an internal temperature of 50° C. to one weight part of resin liquid C. Subsequently, when 2.5 weight parts of a mixed solution of methanol:water=1:1 were added dropwise at an internal temperature range of 45 to 55° C., a solid material precipitated. The solid material that precipitated was filtered out, 1.5 weight parts of acetone were added, and the mixture was fully dissolved by stirring at 50° C. When 2.5 weight parts of a mixed solution of methanol:water=1:1 were added dropwise at an internal temperature range of 45 to 55° C., a solid material precipitated. The solid material that precipitated was filtered out and the product was dried for 24 hours at 30° C. under a vacuum.

The sulfur content of the product obtained by the above operations was quantified from the area of the peak of elemental sulfur (S) by fluorescence X-ray analysis as 280 meq/g. Based on the unreacted epoxy group-containing vinyl chloride copolymer and the change in the sulfur content relative to resin liquid C following the conclusion of the reaction, the quantity of sulfonic acid salt groups incorporated by the reaction was calculated as 210 meq/g. The product (dry powder) obtained by the above operations was dissolved in deuterated chloroform and the absence of undissolved material was confirmed. In addition, the deuterated chloroform solution was measured by H-NMR and the absence of a peak derived from taurine in the vicinity of 2 to 3 ppm was confirmed.

Based on the above results, the quantity of sulfonic acid salt groups that were incorporated into the vinyl polymer by the reaction was determined to be 210 meq/g.

Example 4

To 5.6 weight parts of methanol were added 1.0 weight part of taurine and 0.5 weight part of potassium hydroxide and the mixture was stirred for one hour (preparation of first liquid).

To the first liquid that had been prepared was added a liquid (the second liquid) comprised of 16.7 weight parts of epoxy group-containing vinyl chloride copolymer (MR104 made by Zeon Corp.) and 38.9 weight parts of cyclohexanone, after which the mixture was stirred for 5 hours while maintaining an internal temperature of 40 to 60° C. Next, the reaction liquid was stirred for 30 minutes under conditions of a reduced pressure of 100 mmHg to obtain resin liquid D.

When the methanol contained in the resin liquid D that was obtained was analyzed by the above method, the level was below the detection threshold.

One weight part of acetone was added at an internal temperature of 50° C. to one weight part of resin liquid D. Subsequently, when 2.5 weight parts of a mixed solution of methanol:water=1:1 were added dropwise at an internal temperature range of 45 to 55° C., a solid material precipitated. The solid material that precipitated was filtered out, 1.5 weight parts of acetone were added, and the mixture was fully dissolved by stirring at 50° C. When 2.5 weight parts of a mixed solution of methanol:water=1:1 were added dropwise at an internal temperature range of 45 to 55° C., a solid material precipitated. The solid material that precipitated was filtered out and the product was dried for 24 hours at 30° C. under a vacuum.

The sulfur content of the product obtained by the above operations was quantified from the area of the peak of elemental sulfur (S) by fluorescence X-ray analysis as 550 meq/g. Based on the unreacted epoxy group-containing vinyl chloride copolymer and the change in the sulfur content relative to resin liquid D following the conclusion of the reaction, the quantity of sulfonic acid salt groups incorporated by the reaction was calculated as 210 meq/g. The product (dry powder) obtained by the above operations was dissolved in deuterated chloroform and the absence of undissolved material was confirmed. In addition, the deuterated chloroform solution was measured by H-NMR and the absence of a peak derived from taurine in the vicinity of 2 to 3 ppm was confirmed.

Based on the above results, the quantity of sulfonic acid salt groups that was incorporated into the vinyl polymer by the reaction was determined to be 480 meq/g.

Comparative Example 1

To 5.0 weight parts of methanol were added 1.0 weight part of ortho-aminobenzenesulfonic acid and 0.33 weight part of potassium hydroxide and the mixture was stirred for one hour. To the liquid that had been prepared was added a liquid comprised of 37.5 weight parts of epoxy group-containing vinyl chloride copolymer (MR104 made by Zeon Corp.) and 125.0 weight parts of cyclohexanone and the mixture was stirred for 5 hours while maintaining an internal temperature of 40 to 60° C. At that point, a highly insoluble precipitate was produced in the reaction, and no polymer that was soluble in solvent was obtained.

Example 5

To 5.0 weight parts of methanol were added 1.0 weight part of meta-aminobenzenesulfonic acid and 0.33 weight part of potassium hydroxide and the mixture was stirred for one hour (preparation of first liquid).

To the first liquid that had been prepared was added a liquid (the second liquid) comprised of 37.5 weight parts of epoxy group-containing vinyl chloride copolymer (MR104 made by Zeon Corp.) and 125.0 weight parts of cyclohexanone, after which the mixture was stirred for 5 hours while maintaining an internal temperature of 40 to 60° C. Next, the reaction liquid was stirred for 30 minutes under conditions of a reduced pressure of 100 mmHg to obtain resin liquid E.

When the methanol contained in the resin liquid E that was obtained was analyzed by the above method, the level was below the detection threshold.

One weight part of acetone was added at an internal temperature of 50° C. to one weight part of resin liquid E. Subsequently, when 2.5 weight parts of a mixed solution of methanol:water=1:1 were added dropwise at an internal temperature range of 45 to 55° C., a solid material precipitated. The solid material that precipitated was filtered out, 1.5 weight parts of acetone were added, and the mixture was fully dissolved by stirring at 50° C. When 2.5 weight parts of a mixed solution of methanol:water=1:1 were added dropwise at an internal temperature range of 45 to 55° C., a solid material precipitated. The solid material that precipitated was filtered out and the product was dried for 24 hours at 30° C. under a vacuum.

The quantity of sulfonic acid salt groups that had been incorporated by the reaction was determined to be 220 meq/g by the same methods as in Examples 1 to 4 for the product obtained by the above operations, and the quantity of sulfonic acid salt groups incorporated into the vinyl polymer by the reaction was determined to be 150 meq/g.

Comparative Example 2

To 5.0 weight parts of methanol were added 1.0 weight part of para-aminobenzenesulfonic acid and 0.33 weight part of potassium hydroxide and the mixture was stirred for one hour. To the liquid that had been prepared was added a liquid comprised of 37.5 weight parts of epoxy group-containing vinyl chloride copolymer (MR104 from Zeon Corp.) and 125.0 weight parts of cyclohexanone and the mixture was stirred for 5 hours while maintaining an internal temperature of 40 to 60° C. At that point, a highly insoluble precipitate was produced in the reaction, and no polymer that was soluble in solvent was obtained.

Example 6

To 5.0 weight parts of methanol were added 1.0 weight part of N-methyltaurine and 0.42 weight part of potassium hydroxide and the mixture was stirred for one hour (preparation of first liquid).

To the first liquid that had been prepared was added a liquid (the second liquid) comprised of 37.5 weight parts of epoxy group-containing vinyl chloride copolymer (MR104 made by Zeon Corp.) and 125.0 weight parts of cyclohexanone, after which the mixture was stirred for 5 hours while maintaining an internal temperature of 40 to 60° C. Next, the reaction liquid was stirred for 30 minutes under conditions of a reduced pressure of 100 mmHg to obtain resin liquid F.

When the methanol contained in the liquid that was obtained was analyzed by the above method, the level was below the detection threshold.

One weight part of acetone was added at an internal temperature of 50° C. to one weight part of resin liquid F. Subsequently, when 2.5 weight parts of a mixed solution of methanol:water=1:1 was added dropwise at an internal temperature range of 45 to 55° C., a solid material precipitated. The solid material that precipitated was filtered out, 1.5 weight parts of acetone were added, and the mixture was fully dissolved by stirring at 50° C. When 2.5 weight parts of a mixed solution of methanol:water=1:1 were added dropwise at an internal temperature range of 45 to 55° C., a solid material precipitated. The solid material that precipitated was filtered out and the product was dried for 24 hours at 30° C. under a vacuum.

The quantity of sulfonic acid salt groups that had been incorporated by the reaction was determined to be 250 meq/g by the same methods as in Examples 1 to 4 for the product obtained by the above operations, and the quantity of sulfonic acid salt groups incorporated into the vinyl polymer by the reaction was determined to be 180 meq/g.

2. Evaluation of Dispersion-Enhancing Effect

The solvents were distilled off under reduced pressure from the resin liquids obtained in the Examples and comparative examples. The resin obtained from "resin liquid A" is referred to as "resin A" hereinafter. The same applies to the other resins.

[Evaluation 1]

In a liquid comprised of 3.3 weight parts of cyclohexanone and 4.9 weight parts of methyl ethyl ketone (2-butanone) were suspended 2.2 weight parts of the following ferromagnetic hexagonal ferrite power indicated below and 1 weight part of resin A. To the suspension were added 27 weight parts of zirconia beads (made by Nikkato) 0.1 mm in diameter. The mixture was dispersed for 15 hours, yielding magnetic coating material 1.

The dispersed particle diameter of the hexagonal ferrite powder in the magnetic coating material obtained was measured by the following method at 59 nm.

Ferromagnetic Hexagonal Barium Ferrite Powder

Composition excluding oxygen (molar ratio): Ba/Fe/Co/Zn=1/9/0.2/1

Hc: 176 kA/m (2,200 Oe)

Average plate diameter: 25 nm

Average plate ratio: 3

Specific surface area by BET method: 65 $m^2/g$

σs: 49 $A \cdot m^2/kg$ (49 emu/g)

pH: 7

Method of Measuring Dispersed Particle Diameter

The magnetic coating material was diluted to a solid component concentration of 0.2 weight % with a mixed solution of cyclohexanone and methyl ethyl ketone in a volumetric ratio of cyclohexanone:methyl ethyl ketone of 6.0:9.0 (the solid component denoted the combined weight of hexagonal ferrite powder, polymer, and dispersing agent). A Horiba LB-500 dynamic light scattering particle size distribution analyzer was employed to measure the average particle diameter of the hexagonal ferrite powder in the diluted solution, and that value was adopted as the dispersed particle diameter. The smaller the dispersed particle diameter, the better the dispersion of the hexagonal ferrite powder without aggregation that was indicated.

[Evaluation 2]

In a liquid comprised of 3.3 weight parts of cyclohexanone and 4.9 weight parts of methyl ethyl ketone were suspended 2.2 weight parts of the above ferromagnetic hexagonal ferrite powder, 1 weight part of resin A, and 0.033 weight part of oleic acid. To the suspension were added 27 weight parts of zirconia beads (made by Nikkato) 0.1 mm in diameter, and the mixture was dispersed for 15 hours to obtain a magnetic coating material 2.

The dispersed particle diameter of the hexagonal ferrite powder in the magnetic coating material obtained as measured by the above method was 49 nm.

[Evaluation 3]

In a liquid comprised of 3.3 weight parts of cyclohexanone and 4.9 weight parts of methyl ethyl ketone were suspended 2.2 weight parts of the above ferromagnetic hexagonal ferrite powder, 1 weight part of resin A, and 0.13 weight part of 2,3-dihydroxynaphthalene. To the suspension were added 27 weight parts of zirconia beads (made by Nikkato) 0.1 mm in diameter, and the mixture was dispersed for 15 hours to obtain a magnetic coating material 3.

The dispersed particle diameter of the hexagonal ferrite powder in the magnetic coating material obtained as measured by the above method was 35 nm.

[Evaluation 4]

With the exception that the 1 weight part of resin A was changed to 1 weight part of resin B, a magnetic coating material 4 was obtained by the same method as in Evaluation 3.

The dispersed particle diameter of the hexagonal ferrite powder in the magnetic coating material obtained as measured by the above method was 33 nm.

[Evaluation 5]

With the exception that the 1 weight part of resin A was changed to 1 weight part of resin C, a magnetic coating material 4 was obtained by the same method as in Evaluation 3.

The dispersed particle diameter of the hexagonal ferrite powder in the magnetic coating material obtained as measured by the above method was 33 nm.

[Evaluation 6]

With the exception that the 1 weight part of resin A was changed to 1 weight part of resin E, a magnetic coating material 6 was obtained by the same method as in Evaluation 3.

The dispersed particle diameter of the hexagonal ferrite powder in the magnetic coating material obtained as measured by the above method was 36 nm.

[Evaluation 7]

With the exception that the 1 weight part of resin A was changed to 1 weight part of resin F, a magnetic coating material 7 was obtained by the same method as in Evaluation 3.

The dispersed particle diameter of the hexagonal ferrite powder in the magnetic coating material obtained as measured by the above method was 36 nm.

[Evaluation 8]

With the exception that the 1 weight part of resin A was changed to 1 weight part of resin G (MR104: vinyl chloride copolymer made by Zeon Corp.), a magnetic coating material 8 was obtained by the same method as in Evaluation 1.

The dispersed particle diameter of the hexagonal ferrite powder in the magnetic coating material obtained as measured by the above method was 91 nm.

[Evaluation 9]

With the exception that the 1 weight part of resin A was changed to 1 weight part of resin G, a magnetic coating material 9 was obtained by the same method as in Evaluation 2.

The dispersed particle diameter of the hexagonal ferrite powder in the magnetic coating material obtained as measured by the above method was 59 nm.

[Evaluation 10]

With the exception that the 1 weight part of resin A was changed to 1 weight part of resin G, a magnetic coating material 10 was obtained by the same method as in Evaluation 3.

The dispersed particle diameter of the hexagonal ferrite powder in the magnetic coating material obtained as measured by the above method was 44 nm.

The above evaluation results are given in Table 1.

TABLE 1

| | Resin | | | |
| Evaluation | Type | Component of the first liquid employed for the preparation of resin | Dispersing agent | Dispersed particle diameter (nm) |
| --- | --- | --- | --- | --- |
| 1 | A | Taurine | None | 59 |
| 8 | G | — | None | 91 |
| 2 | A | Taurine | Oleic acid | 49 |
| 9 | G | — | Oleic acid | 59 |
| 3 | A | Taurine | 2,3-dihydroxynaphthalene | 35 |
| 4 | B | Taurine | 2,3-dihydroxynaphthalene | 33 |
| 5 | C | Taurine | 2,3-dihydroxynaphthalene | 33 |

TABLE 1-continued

| | | Resin | | |
|---|---|---|---|---|
| Evaluation | Type | Component of the first liquid employed for the preparation of resin | Dispersing agent | Dispersed particle diameter (nm) |
| 6 | E | Meta-aminobenzene-sulfonic acid | 2,3-dihydroxynaphthalene | 36 |
| 7 | F | N-methyl taurine | 2,3-dihydroxynaphthalene | 36 |
| 10 | G | — | 2,3-dihydroxynaphthalene | 44 |

Based on the results given in Table 1, it was determined that by having a polar group, the polar group-containing (sulfonic acid salt group-containing) vinyl polymer of the present invention achieved greater dispersion of microparticulate magnetic powder than the vinyl polymer (resin G) in which it was not present, and that the combined use of a carboxyl group-containing compound or a phenol compound achieved an even greater improvement in dispersion. In the above Examples, potassium hydroxide was employed to prepare the first liquid. Thus, a vinyl polymer incorporating potassium sulfonate was obtained. However, it is also possible to conduct a salt exchange reaction by a known method following the addition reaction to obtain a vinyl polymer containing a sulfonic acid salt group comprising cations other than sulfonic acid groups and potassium.

Further, as indicated in the above Examples, the polar group-containing vinyl polymer of the present invention can be obtained in a reaction system containing a ketone solvent that is a commonly employed solvent during the fabrication of the particulate magnetic recording medium. Following the reaction, no residual methanol, which was employed in combination as a reaction solvent, was found. Accordingly, the reaction liquid following the reaction could be used as is as a magnetic recording medium binder composition to fabricate a particulate magnetic recording medium without a subsequent step such as solvent removal.

3. Examples and Comparative Examples of the Fabrication of Magnetic Recording Media In the Examples and comparative examples of the fabrication of magnetic recording media set forth below, unless specifically indicated otherwise, "parts" and "%" denote weight parts and weight %.

Example 7

| 1. Formula of magnetic layer coating liquid | |
|---|---|
| Ferromagnetic plate-like hexagonal ferrite powder | 100 parts |
| Composition excluding oxygen (molar ratio): | |
| Ba/Fe/Co/Zn = 1/9/0.2/1 | |
| Hc: 183 kA/m (about 2,300 Oe) | |
| Plate diameter: 25 nm | |
| Plate ratio: 3 | |
| Specific surface area by BET method: 80 m$^2$/g | |
| σs: 50 A · m$^2$/kg (50 emu/g) | |
| Polyether polyurethane resin: | 5 parts |
| Functional group: $SO_3Na$ | |
| Functional group concentration: 180 eq/t | |
| Resin liquid C, converted to solid component of resin C: | 10 parts |
| Oleic acid: | 2 parts |
| 2,3-Dihydroxynaphthalene: | 6 parts |

| 1. Formula of magnetic layer coating liquid | |
|---|---|
| α-Al$_2$O$_3$ (particle size: 0.15 μm): | 5 parts |
| Diamond powder (average particle diameter: 80 nm): | 2 parts |
| Carbon black (particle size: 20 nm): | 2 parts |
| Cyclohexanone: | 110 parts |
| Methyl ethyl ketone: | 100 parts |
| Toluene: | 100 parts |
| Butyl stearate: | 2 parts |
| Stearic acid: | 1 part |

| 2. Formula of nonmagnetic layer coating liquid | |
|---|---|
| Nonmagnetic inorganic powder: | 85 parts |
| α-Iron oxide | |
| Surface treatment agents: Al$_2$O$_3$, SiO$_2$ | |
| Major axis diameter: 0.15 μm | |
| Tap density: 0.8 | |
| Acicular ratio: 7 | |
| BET specific surface area: 52 m$^2$/g | |
| pH 8 | |
| DBP oil absorption capacity: 33 g/100 g | |
| Carbon black: | 20 parts |
| DBP oil absorption capacity: 120 mL/100 g | |
| pH: 8 | |
| Specific surface area by BET method: 250 m$^2$/g | |
| Volatile content: 1.5% | |
| Polyurethane resin: | 15 parts |
| (Functional group: $SO_3Na$, | |
| functional group concentration: 180 eq/t) | |
| Phenylphosphonic acid: | 3 parts |
| α-Al$_2$O$_3$ (average particle diameter: 0.2 μm): | 10 parts |
| Cyclohexanone: | 140 parts |
| Methyl ethyl ketone: | 170 parts |
| Butyl stearate: | 2 parts |
| Stearic acid: | 1 part |

4. Preparation of Magnetic Tape

The various components of the above magnetic layer coating liquid formula and nonmagnetic layer coating liquid formula were kneaded for 60 minutes in an open kneader and then dispersed for 720 minutes in a sand mill using zirconia beads (0.5 mm in diameter). To the dispersion obtained were added 6 parts of trifunctional low-molecular-weight polyisocyanate compound (Coronate 3041, made by Nippon Polyurethane Industry Co., Ltd.) and the mixture was stirred for 20 minutes. Subsequently, the mixture was filtered with a filter having an average pore diameter of 1 μm to prepare a magnetic layer coating liquid and a nonmagnetic layer coating liquid.

The nonmagnetic layer coating liquid was coated in a quantity calculated to yield a dry thickness of 1.5 μm on a polyethylene naphthalate support 5 μm in thickness and dried at 100° C. The magnetic layer coating liquid was applied wet-on-dry in a quantity calculated to yield a dry thickness of 0.08 μm on the nonmagnetic layer that had been formed and dried at 100° C. At the time, the magnetic layer was magnetically oriented with 300 mT (3,000 Gauss) magnets while still state. A surface smoothing treatment was applied at 90° C. and a linear pressure of 300 kg/cm at a rate of 100 m/min with a seven-stage calender comprised solely of metal rolls, after which a heat curing treatment was conducted for 24 hours at 70° C. and the product was slit into a ½ inch width to prepare a magnetic tape.

Comparative Example 3

With the exception that the resin liquid C (10 parts as converted to solid component of resin C) employed to form the magnetic layer was replaced with 10 parts of resin G, a magnetic tape was fabricated by the same method as in Example 7.

Comparative Example 4

With the exceptions that the resin liquid C (10 parts as converted to solid component of resin C) employed to form the magnetic layer was replaced with 10 parts of resin G and 0.4 part of the potassium salt of taurine (potassium 2-aminoethanesulfonate) obtained in Reference Example 1 below was added as a magnetic layer component, a magnetic tape was fabricated by the same method as in Example 7.

Reference Example 1

To 6.3 weight parts of methanol were added 1.0 weight part of taurine and 0.5 weight part of potassium hydroxide and the mixture was stirred for one hour. The liquid obtained was concentrated and dried, yielding potassium 2-aminoethanesulfonate.

Evaluation of Dispersibility of Magnetic Layer Coating Liquid (1) Measurement of Dispersed Particle Diameter Portions of the magnetic layer coating liquids prepared in Example 7 and Comparative Examples 3 and 4 were collected and the dispersibility thereof were evaluated by the above method of measuring the dispersed particle diameter.

(2) Measurement of Squareness

To evaluate the dispersibility of the ferromagnetic powders in the magnetic layer coating liquids prepared in Example 7 and Comparative Examples 3 and 4, a magnetic sheet was prepared for evaluation by the following method.

An adhesive layer in the form of sulfonic acid-containing polyester resin was coated on a polyethylene naphthalate resin support 5 μm in thickness with a center line surface roughness of the magnetic layer coated surface of 0.003 μm using a coil bar such that the thickness upon drying would be 0.05 μm.

Next, the magnetic layer coating liquid was coated in a quantity calculated to yield a thickness of 1.0 μm upon drying, oriented with a solenoid having a magnetic strength of 0.4 T (4,000 G), and dried. Processing was then conducted at a rate of 80 m/min at a temperature of 100° C. with a seven-stage calender comprised of metal rolls to obtain a magnetic sheet.

The magnetic characteristics of the magnetic sheet obtained were measured when an external magnetic field was applied in parallel to the direction of orientation of the ferromagnetic powder using a vibrating sample magnetometer (VSM-P7 from Toei Industry Co., Ltd.). Specifically, the ratio of the value of the magnetization (saturation magnetization) when an external magnetic field of 797.7 kA/m (10 kOe) was applied to the value of the magnetization when the external magnetic field was zero (residual magnetization)—that is, the squareness (SQ)—was measured.

The SQ can be used as an index of the dispersibility of a ferromagnetic powder. The lower the dispersibility, the lower SQ becomes, and vice versa. The value of SQ in the magnetic recording medium is impacted by noise, and increases in desirability as it approaches 1.0.

Evaluation of the Magnetic Tape

The surface roughness (AFM-Ra) of the magnetic layer surface of each of the magnetic recording tapes obtained in Example 7 and Comparative Examples 3 and 4 was determined by scanning an area of 30 μm×30 μm with a bias current of 400 mV and a tunneling current of 10 nA by an atomic force microscope (AFM) (Nanoscope II made by Digital Instruments).

The results of the above evaluation are given in Table 2.

TABLE 2

| | Dispersed particle diameter [nm] | Squareness | Surface roughness [nm] |
|---|---|---|---|
| Ex. 7 | 37 | 0.754 | 1.9 |
| Comp. Ex. 3 | 42 | 0.752 | 2.5 |
| Comp. Ex. 4 | 43 | 0.749 | 2.0 |

Based on a comparison of Example 7 and Comparative Example 3 in Table 2, since the polar group-containing (sulfonic acid salt group-containing) vinyl polymer of the present invention contained a polar group, it had higher dispersibility of microparticulate magnetic powder than the vinyl polymer (resin G) that did not. That indicated that a magnetic tape that afforded good electromagnetic characteristics could be obtained as the result of good surface smoothness.

Comparative Example 4 is an example in which a sulfonic acid salt group-containing compound was employed as a magnetic layer component without conducting an addition reaction to incorporate a polar group into the polymer. Japanese Unexamined Patent Publication (KOKAI) Heisei No. 5-65162 reports that the use of such a sulfonic acid salt group-containing compound as a magnetic layer component increased dispersion, but no increased dispersion was achieved, as shown in Table 2.

These results indicate that increasing the dispersion of microparticulate magnetic powder by the present invention provided a magnetic recording medium having good surface smoothness.

Reference Example 2

A 1.0 weight part quantity of taurine (Wako Pure Chemical Industries, Ltd.), 0.58 weight part of potassium hydroxide, and 5.0 weight parts of water were mixed and thoroughly dissolved. After adding 1.9 weight part of allyl glycidyl ether (Tokyo Chemical Industry Co., Ltd.), the temperature was raised to 50° C. and the mixture was stirred for 5 hours.

Next, 5 weight parts of toluene were added. The mixture was stirred, left standing, and the aqueous layer was removed. The aqueous layer that was obtained was concentrated and dried to obtain a dried solid material. The $^1$H-NMR data and their assignments for the dried solid material are given below. In the present reference example, a 400 MHz NMR (Avance II 400 made by Bruker) was employed for $^1$H-NMR measurement.

$^1$H NMR (D$_2$O=4.75 ppm) δ(ppm)=2.65 (2H, m), 3.05 (2H, m), 3.52 (4H, m), 3.62 (4H, m), 3.95 (2H, m), 4.10 (4H, dd), 5.31 (2H, d), 5.38 (2H, d), 5.99 (2H, m).

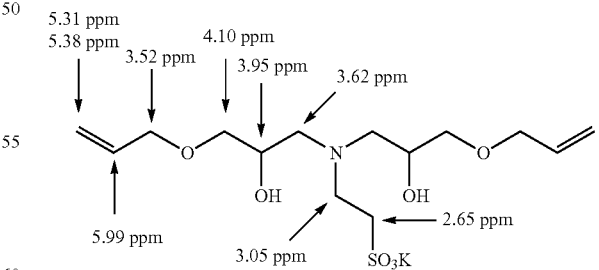

$^1$H-NMR measurements were similarly made for the allyl glycidyl ether employed in Reference Example 2. The $^1$H-NMR data and their assignments are given below.

$^1$H NMR (CDCl$_3$=7.27 ppm) δ(ppm)=2.62 (1H, q), 2.81 (1H, t), 3.17 (1H, m), 3.41 (1H, q), 3.73 (1H, dd), 4.05 (2H, m), 5.20 (1H, dd), 5.29 (1H, dd), 5.92 (1H, m).

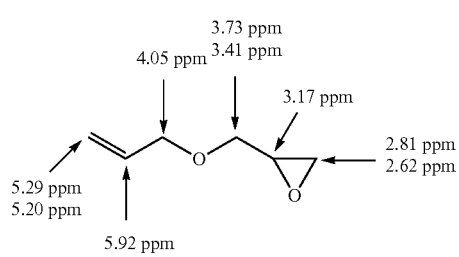

Reference Example 2 confirmed that when an addition reaction was conducted on an epoxy group-containing monomer (allyl glycidyl ether) by a method such as that described in Reference 1, a bifunctional vinyl monomer was produced. Using a bifunctional vinyl monomer in a polymerization reaction in this manner caused a vinyl polymer with a multi-dimensional crosslinked structure to form and presented the risk of making it difficult to control the reaction.

By contrast, in the present invention, an addition reaction was conducted on a polymer as set forth above, making it possible to obtain a desired polar group-containing vinyl polymer without difficulty in controlling the reaction.

The present invention is useful in the area of manufacturing magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing a vinyl polymer, which comprises:
    mixing a first liquid and a second liquid to conduct an addition reaction, wherein
    the first liquid has been obtained by reacting a sulfonic acid group-containing compound selected from the group consisting of taurine, N-methyl taurine, and meta-aminobenzenesulfonic acid with an alkali metal hydroxide in methanol,
    the second liquid comprises a vinyl polymer having an intramolecular epoxy group in a ketone solvent, and
    the addition reaction incorporates a sulfonic acid alkali metal salt group onto a side chain of the vinyl polymer.

2. The method of manufacturing a vinyl polymer according to claim 1, wherein the vinyl polymer is a vinyl chloride polymer.

3. The method of manufacturing a vinyl polymer according to claim 1, wherein an epoxy group content in the vinyl polymer having an intramolecular epoxy group ranges from 0.5 to 10.0 weight %.

4. The method of manufacturing a vinyl polymer according to claim 1, which comprises converting an alkali metal ion contained in the sulfonic acid alkali metal salt group into a proton or other cation by a salt exchange reaction.

* * * * *